(12) United States Patent
Oehninger

(10) Patent No.: US 7,743,695 B2
(45) Date of Patent: Jun. 29, 2010

(54) ESPRESSO COFFEE MAKER HAVING AN ESPRESSO BREW UNIT

(75) Inventor: Max Oehninger, Stäfa (CH)

(73) Assignee: Eugster/Frismag AG, Romanshorn (CH)

( * ) Notice: Subject to any disclaimer, the term of this patent is extended or adjusted under 35 U.S.C. 154(b) by 406 days.

(21) Appl. No.: 11/487,238

(22) Filed: Jul. 14, 2006

(65) Prior Publication Data

US 2007/0012194 A1    Jan. 18, 2007

(30) Foreign Application Priority Data

Jul. 16, 2005    (DE) .................. 20 2005 011 204 U

(51) Int. Cl.
*A47J 31/00* (2006.01)
(52) U.S. Cl. .............. 99/280; 99/291; 99/293; 99/295
(58) Field of Classification Search ........... 99/279–323, 99/452–455, 275, 323.1, 323.2; 126/20, 126/369, 369.1; 261/DIG. 16, DIG. 76, 121.1
See application file for complete search history.

(56) References Cited

U.S. PATENT DOCUMENTS 4,945,824 A * 8/1990 Borgmann ............... 99/293
6,662,955 B1 * 12/2003 Lassota ................. 210/482

FOREIGN PATENT DOCUMENTS

| DE | 34 22 432 | 12/1985 |
|---|---|---|
| DE | 42 08 854 | 9/1993 |
| DE | 20 2004 018776 | 2/2005 |
| DE | 20 2004 018 776 | 3/2005 |
| DE | 20 2004 020 919 | 5/2006 |
| EP | 0 486 434 | 5/1992 |

* cited by examiner

*Primary Examiner*—Timothy F. Simone
(74) *Attorney, Agent, or Firm*—William L. Androlia; H. Henry Koda

(57) ABSTRACT

In an espresso coffee maker having an espresso brew unit (1) and a coffee outflow duct (18) in fluid-conductive connection with the espresso brew unit via a crema valve (15) and having an end sided coffee outflow (19), no brewed residual coffee should remain in the coffee outflow duct nor leak out, for instance as leakage, through the coffee outflow. In order to avoid this, a return-flow suction unit (21), which is preferably independent except for a drive means, is in fluid-conductive connection with the coffee outflow duct (18) between crema valve (15) and coffee outflow (19), which is automatically activated when a brewing process is finished.

7 Claims, 3 Drawing Sheets

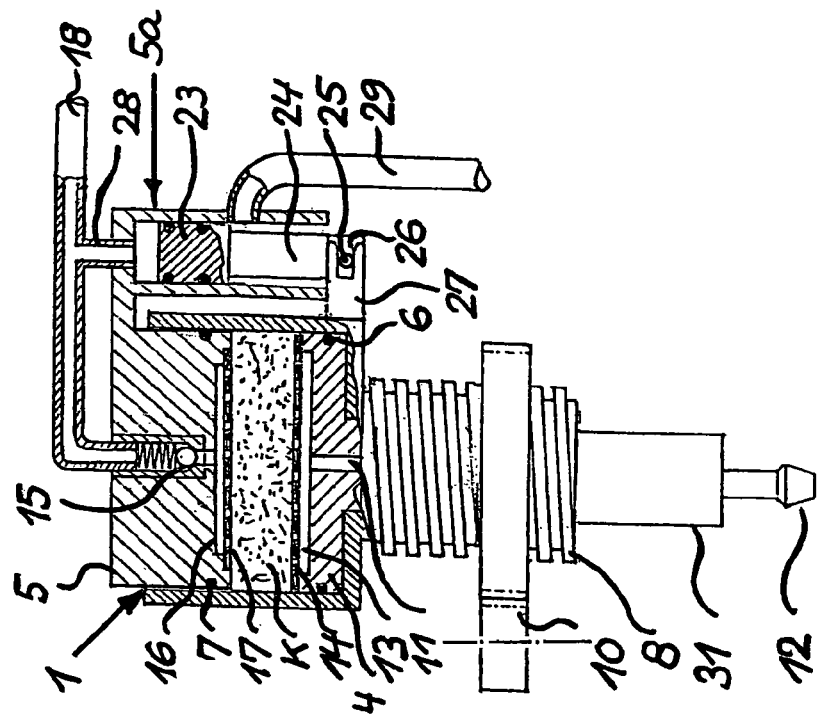
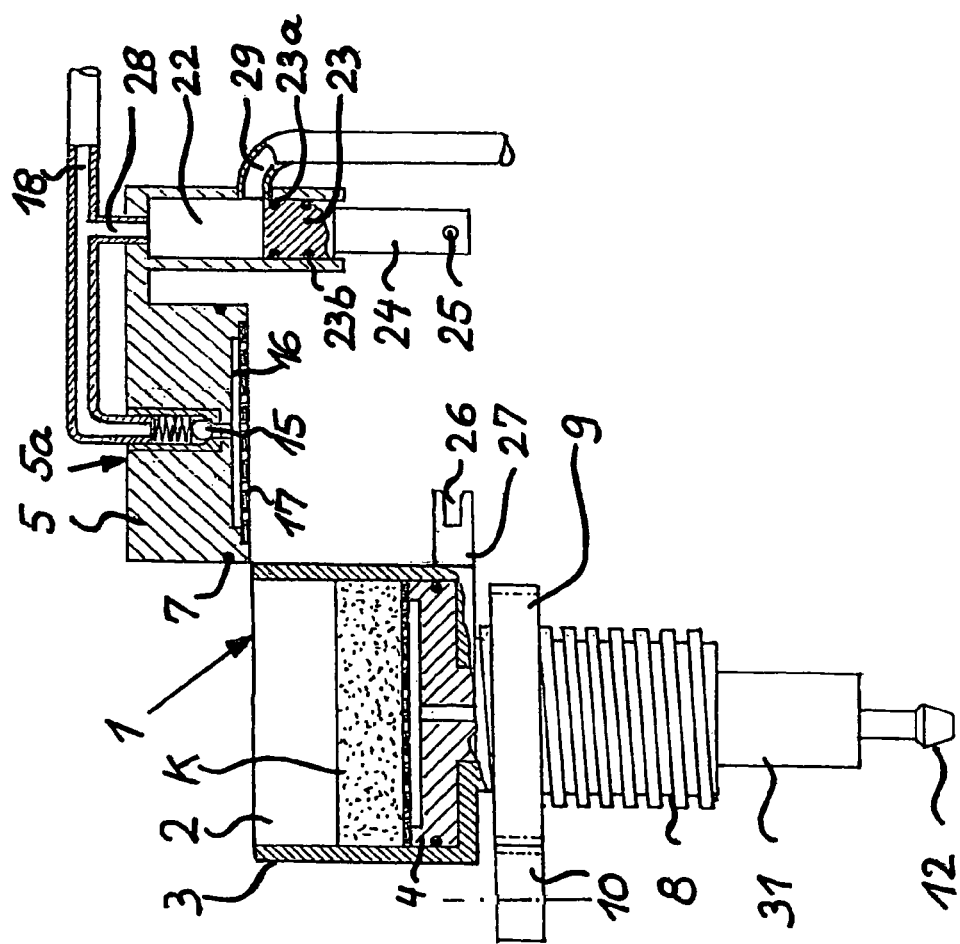

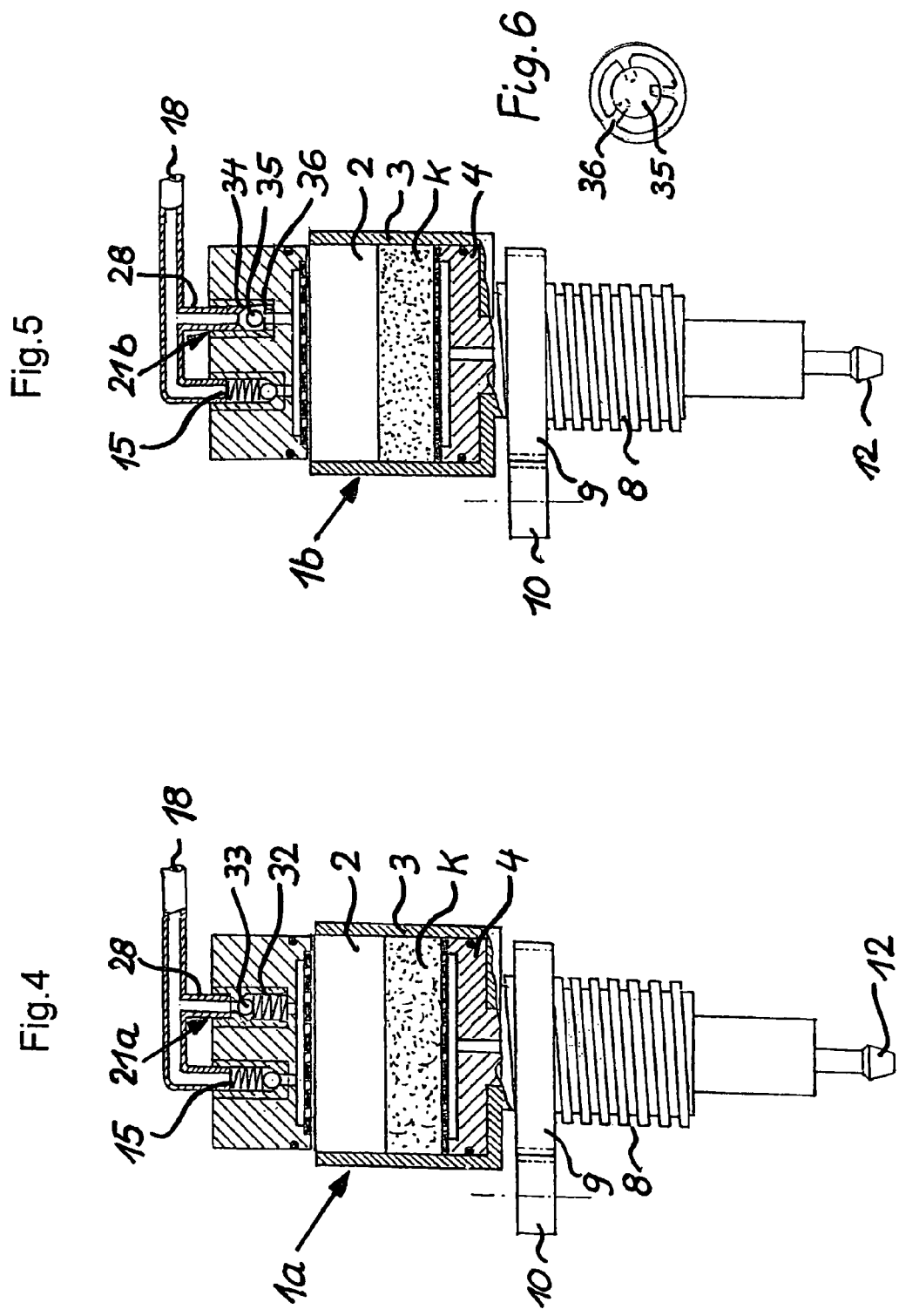

ESPRESSO COFFEE MAKER HAVING AN ESPRESSO BREW UNIT

BACKGROUND OF THE INVENTION

1. Field of the Invention

The present invention relates to an espresso coffee maker having an espresso brew unit and a coffee outflow duct in fluid-conductive connection with the espresso brew unit via a crema valve and having an end sided coffee outflow.

2. Description of the Related Art

In such prior art espresso coffee makers, when finishing the brewing process and hence closing the crema valve, residual coffee will remain in the coffee outflow duct which connects, as a hose and/or tubular duct, the espresso brew unit with the coffee outflow. This residual coffee will either leave the coffee outflow as a slow leakage even if there is no receptacle under it, or the residual coffee will remain in the coffee outflow duct until a further brewing process is initiated thus causing a quality loss of the espresso later freshly brewed. The slow leakage from the coffee outflow can soil its surroundings, and in case of careless or awkward handling, even the danger of scalding cannot be completely ruled out.

BRIEF SUMMARY OF THE INVENTION

It is, therefore, the object of the present invention to further develop an espresso coffee maker, while avoiding the above referenced disadvantages, so that after the brewing process during the course of which one, or a plurality of, espresso cups have been filled under the coffee outflow, no coffee brew, or espresso, respectively, will flow out from the coffee outflow uncontrolled, which is to be obtained by using means as uncomplicated as possible.

This problem is solved by means of an espresso coffee maker according to the present invention.

Essential of this espresso coffee maker is the principle that a return-flow suction unit is in fluid-conductive connection with the coffee outflow duct between the crema valve and the coffee outflow, i.e. at a location remote from the coffee outflow, which is automatically activated when a brewing process is finished. The prevention of a slow leakage after the brewing process does not, therefore, require the operator's attention nor any further servicing.

The return-flow suction unit which can automatically be activated when the brewing process has been finished and which sucks off the coffee residue from the coffee outflow duct before it can exit through the outflow can be materialized in various ways.

According to the eleventh aspect of the present invention, the return-flow suction unit constitutes an independent unit, which means an additional unit in addition to the well-known espresso brew unit and in particular to the brew chamber thereof. However, if necessary the return-flow suction unit can, with advantage, be connected mechanically and force-lockingly with a brew chamber element to be actuated and activated by it.

In a preferred embodiment of the return-flow suction unit by means of which the coffee outflow duct is reliably positively drained so that no residual coffee remains in it when the brewing process has been finished, one starts, according to the second aspect of the present invention, from an espresso brew unit which, as known per se, includes a brew chamber having at least one movable brew chamber element which when the brewing process has been finished is moved to a position different from the one before. This movement is also used to drive the return-flow suction unit that is disposed outside the brew chamber adjacent to the movable brew chamber element and includes a suction piston that is movable within a suction cylinder. The suction cylinder is connected with a drain duct which leads to a location of the espresso coffee maker at which the residual coffee can be exhausted without any problems, for instance into a collecting vessel. The concept of the movable brew chamber element can broadly be interpreted; in particular, it may comprise a drive organ of the movable brew chamber element or a connecting organ between the latter and the drive organ. The actuation of the return-flow suction unit is in any case effected automatically and in synchronism with the movement of the movable brew chamber element, which is performed for exerting the normal espresso brewing function of the espresso brew unit.

In accordance with the third aspect of the present invention, it is particularly to be preferred that the movable brew chamber element constitutes a brew chamber cylinder disposed underneath a top ram so that, together with it, it can form a brew chamber, if necessary including a bottom ram. On the top ram, the brew chamber cylinder can be moved substantially in vertical direction by means of a brew chamber cylinder drive means which may comprise in particular an elevating spindle in order to close the brew chamber completely. When the brewing process has been finished, the brew chamber cylinder is vertically lowered by means of the brew chamber cylinder drive means in order to disconnect the connection to the top ram and the latter may be moved, limited horizontally, by means of a top ram drive means in order to completely open the brew chamber so that a coffee cake can be pushed out and, if necessary, a fresh portion of ground coffee can be received by the brew chamber before it is closed again. Coupling of the vertical movement of the brew chamber cylinder to the suction piston of the return-flow suction unit or decoupling, respectively, is performed automatically and reliably by means of the horizontal movement of the top ram during the course of its normal function for which a forced function control may be provided in particular. After coupling, the subsequent vertical movement of the brew chamber cylinder is transferred to the suction piston. The drive of the brew chamber cylinder serves, therefore, also to actuate the suction piston. The brew chamber cylinder is vertically moved in particular by means of an elevating spindle including a drive gear and a pinion driving it. In the case of coupled coupling elements, when the top ram is moved into a position adjacent to the chamber system, i.e. into a locking position of the brew chamber, a parallel movement of the suction piston is connected to this vertical movement of the brew chamber cylinder. A horizontal movement of the brew chamber cylinder, on the other hand, which is also provided for exerting the total function of the espresso brew unit, will not be transferred to the suction piston, it rather determines only the coupling of the brew chamber cylinder to the suction piston.

In order for the coupling elements to couple, or decouple, in the above way, at least one of the coupling elements is connected, according to the fourth aspect of the present invention, with the brew chamber cylinder while at least another one of the coupling elements is in connection with the piston rod of the suction piston. This can be a simple force and form-locking connection.

The coupling elements according to the fifth aspect of the present invention are particularly suited since they are reliable and wear resistant. By shaping the suction cylinder with the top ram as one unit, a compact and robust structure is obtained. In particular, this unit constitutes a top ram sliding carriage. The coupling elements may, on one hand, be realized by a horizontal slit open on the front in a drive rod at the brew chamber cylinder and, on the other hand, by a pin which may be inserted by horizontally moving the top ram into the groove. When the bolt has horizontally been inserted into the groove, the groove/pin connection is taken along in a vertical movement of the brew chamber cylinder and the suction piston is correspondingly moved as well. When after a brewing process the brew chamber cylinder is lowered to be detached from the top ram, the suction piston in the suction cylinder is lowered correspondingly whereby the residual coffee is sucked off from the coffee outflow duct.

At the end of this movement, the suction piston has arrived at its dead-center position, according to the sixth aspect of the present invention, below an opening in the suction cylinder, from which the residual coffee can be drained, undisturbed, via a drain duct. It will for instance be taken up by a collecting vessel where it does not bother. The substantially liberally selectable branch-off spot of a suction duct from the coffee outflow duct to the suction cylinder has been indicated in the sixth aspect of the present invention as well.

In a second embodiment of the return-flow suction unit according to the seventh aspect of the present invention, the brew chamber itself forms part of the return-flow suction unit for the residual coffee which has substantially be completed only by an additional valve between the brew chamber and the coffee outflow duct flow-wise in parallel relative to the crema valve. When a brewing process has been finished, the residual coffee is sucked off, in this case, from the coffee outflow duct via the opened valve, when the brew chamber cylinder is lowered together with the bottom ram and in the brew chamber, prior to the opening, an underpressure is developed. The residual coffee flowing for this reason back into the brew chamber can, when the coffee cake is removed, be removed together with it.

The additional valve connected in parallel to the crema valve includes, in the embodiment according to the eighth aspect of the present invention, a spring-loaded ball, which opens the valve in case of underpressure in the brew chamber while, normally, the ball locks the valve seat under the spring load.

In a variant of the valve according to the ninth aspect of the present invention, which can be considered a third embodiment of the return-flow suction unit, the valve includes a ball loaded only by the force of gravity normally on a lower valve seat which is constantly fluid-conductive and which serves for draining residual coffee from the coffee outflow duct after a brew process, as soon as the pressure in the brew chamber falls below a predetermined value. In case of an overpressure in the brew chamber, on the other hand, particularly if brewed espresso flows off, according to the normal function of the espresso coffee maker via the crema valve through the coffee outflow duct into one, or a plurality of, cups, the ball is pressed contrary to the force of gravity against the upper valve seat with the result that the valve locks tightly.

BRIEF DESCRIPTION OF THE SEVERAL VIEWS OF THE DRAWINGS

Embodiments of the invention will in the following be described in more detail based on a drawing including 6 figures, wherein FIG. 2 shows the espresso brew unit and the return-flow suction unit according to FIG. 1, however in the starting position, FIG. 3 shows the espresso brew unit and the return-flow suction unit according to FIG. 1, however in a position following the starting position in which the return-flow suction process is prepared, FIG. 4 shows one variant of the espresso brew unit substantially as in accordance with FIG. 1 including, however, a second embodiment of the return-flow suction unit from a lateral view, partly in cross section, FIG. 5 shows a further variant of the espresso brew unit substantially as in accordance with FIG. 1 including, however, a third embodiment of the return-flow suction unit from a lateral view, partly in cross section, and FIG. 6 shows a detail of the third embodiment of the return-flow suction unit, in particular an enlarged plan view on a lower valve seat.

DETAILED DESCRIPTION OF THE INVENTION

Figure 1:
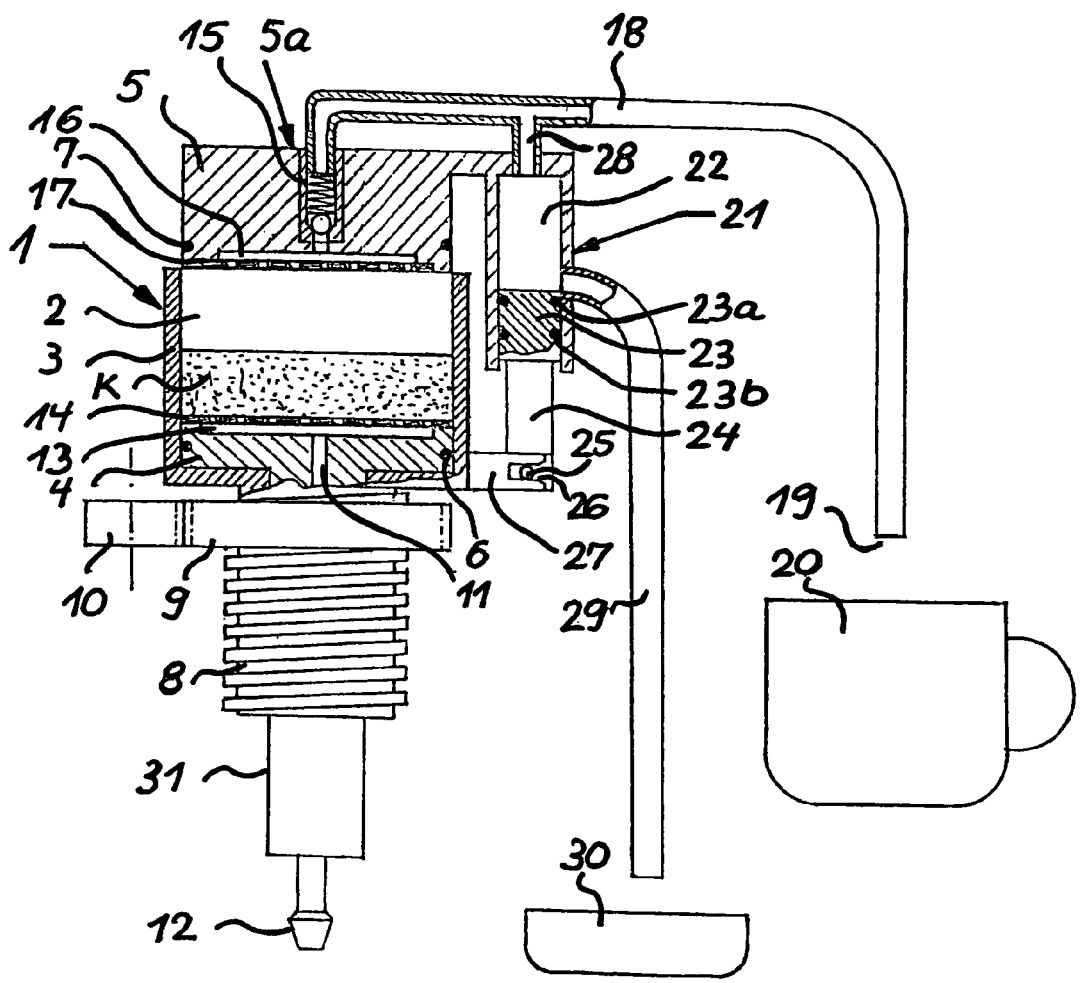
FIG. 1 shows a first preferred embodiment of a return-flow suction unit in connection with an espresso brew unit in a lateral view, partly in cross section, at a position of the espresso brew unit when a residual coffee return-flow suction process has been finished.

In FIG. 1, reference numeral 1 designates an espresso brew unit which, together with further parts not shown in the drawing constitutes an essential part of an espresso coffee maker. The espresso brew unit comprises a brew chamber 2 defined by a vertically movable brew chamber cylinder 3, a bottom ram 4 and a top ram 5. For sealing closed brew chamber 3, seals 6 or 7, respectively, each embedded in the outer periphery of bottom ram 4, or top ram 5, respectively, are provided. For vertical adjustment, the brew chamber cylinder is provided with an elevating spindle 8 which can be elevated, via a drive gear 9 and a gear pinion 10 meshing together with it, by a drive means, not shown, a motor, together with bottom ram 4, see FIG. 3, or can be lowered from the latter position, see FIGS. 1 and 2. The top ram 5 of espresso brew unit 1 belongs to a top ram sliding carriage 5a and can horizontally be moved relative to brew chamber cylinder 3 by a drive assembly, not shown. A top ram sliding carriage guide provided for this purpose has not been shown in the drawings either. From FIGS. 1 and 3, a left position of top ram 5, or top ram sliding carriage 5a, respectively, can been seen wherein the brew chamber is prepared for closure, or is already closed, respectively, and from FIG. 2, a right position of the top ram, or the top ram sliding carriage, respectively, can be seen wherein the brew chamber is completely open. A brew water inlet 11 in the bottom ram is connected with a brew water nozzle 12. Brew water inlet 11 leads into a brew water distribution chamber 13 formed by bottom ram 4 and a brew water sieve 14.

Top ram 5 which can horizontally be moved, by means of top ram sliding carriage 5a, relative to brew chamber cylinder 3 includes a crema valve 15 which opens the brew chamber only when a predetermined overpressure has been reached, and a coffee collecting chamber 16 between crema vale 15 and a coffee sieve 17.

From the crema valve, a coffee outflow duct 18 leads to a coffee outflow 19 under which a cup 20 can be placed.

Espresso brew unit 1 described so far constitutes the state of the art (DE 20 2004 018 776.0).

A first preferred embodiment of a return-flow suction unit 21 assigned to an espresso brew unit 1 is shown in FIGS. 1 through 3. A return-flow suction unit 21 comprises a suction cylinder 22 and a suction piston 23 movable therein having seals 23a, 23b, the suction cylinder 22 being actuated by a piston rod 24. To make this possible, there is provided at the lower end of the piston rod 24 a pin 25 which can get into engagement with a slit 26 open on the front side in a drive rod 27 solidly connected with brew chamber cylinder 3. Suction cylinder 22 receiving suction piston 23 is almost adjacent to top ram 5 so that it does not, however, when in positions of top ram 5 as shown in FIGS. 1 and 3, collide with brew chamber cylinder 3, while in the position according to FIG. 2, it is more distant to brew chamber cylinder 3. Preferably, suction cylinder 22 forms a structural unit with top ram 5 in top ram sliding carriage 5a. This has, inter alia, the advantage that the force-transmitting drive rod 27 to the piston rod pin 25 may be short and, therefore, forming only a short lever arm when transmitting force from the brew chamber cylinder 3 to the suction piston 23, or piston rod 24, respectively.

The return-flow suction unit 21 is in fluid-conductive connection with coffee outflow duct 18 via a suction duct 28 and thus is connected, at a location between crema valve 15 and coffee outflow 19, into coffee outflow duct 18, particularly in the embodiment according to FIGS. 1 through 3 in the horizontal section near crema valve 15. The suction duct 28, on the other hand, opens into a non-designated cylinder head of suction cylinder 22. As can be taken from FIGS. 1 through 3, a drain duct 29 terminates in the interior space of suction cylinder 22 directly above suction piston 23 in the lower dead-center position thereof, as shown in FIGS. 1 and 2. Suction coffee or coffee remainder from coffee outflow duct 18 can thus completely flow off from suction cylinder 22 via drain duct 29 into a collecting vessel 30.

In the position shown in FIG. 2 of the espresso brew unit 1 with the brew chamber cylinder 3 lowered, the top ram 5 is horizontally moved into a right final position in which it opens an upper opening of the brew chamber cylinder completely. In this way, the coupling of the piston rod 24 to the brew chamber cylinder 3 is simultaneously interrupted since the piston rod pin 25 is drawn out of slit 26 of drive rod 27 on brew chamber cylinder 3.

After filling the brew chamber 2 with ground coffee K, the top ram 5 is again moved horizontally over the brew chamber cylinder 3, as in analogy to FIG. 1, so that the piston rod pin 25 glides into the slit 26 of the drive rod 27 which, in this way, is in a position to lift the piston rod 24.

Prior to initiating a brewing process, the brew chamber cylinder 3 is lifted vertically upward, together with bottom ram 4, above the underside of top ram 5, as can be taken from FIG. 3. In that way, the brew chamber 2 is closed and the ground coffee in brew chamber 2 is being compacted. Simultaneously with the vertical movement of the brew chamber cylinder 3, the suction piston 23 is pushed upwardly where it takes a starting position for a subsequent suction function.

After termination of the brewing process during the course of which crema valve 15 was open after the pressure in the brew chamber 2 reached a predetermined value by the hot brew water fed via brew water nozzle 12, the crema valve 15 closes again, and the brew chamber cylinder 3 travels from the position shown in FIG. 3 downward into the position shown in FIG. 1, in which the top ram sliding carriage 5a, or top ram 5, respectively, can be moved horizontally. Simultaneously with lowering of the brew chamber cylinder 3, the suction piston 23 in suction cylinder 22 sucks, since the piston rod 24 is coupled to the drive rod 27, the residual coffee from the coffee outflow duct 18 which is drained through the drain duct 29 to the collecting vessel 30. Subsequently, the brew chamber 2 is opened again by horizontally moving top ram sliding carriage 5a, or top ram 5, respectively, into the right final position shown in FIG. 2 whereupon the coffee grounds cake K, when activating a bottom ram elevating cylinder 31, is elevated by the bottom ram 4 so that it can be discarded. When the bottom ram 4 has come down, one espresso brewing process cycle has been finished.

The second embodiment of the return-flow suction unit 21a according to FIG. 4 includes, instead of the suction cylinder 22 and its coupling elements, in addition to espresso brew unit 1a, only one valve 32 including a spring-loaded ball 33 which, in the closed position shown in FIG. 4, closes an upper valve seat not designated when there is no under pressure in brew chamber 2. The valve 32 will also take this closure position in particular when espresso is brewed by feeding brewing water from the brewing water feeder nozzle 12 over the brewing water distribution chamber 13 into the brew chamber and, when the brew chamber has attained a predetermined internal pressure, flows via the crema valve 15 into the coffee outflow duct 18.

When in order to finish the brewing process the brewing water inflow to the brew chamber 2 has been stopped and when the brew chamber cylinder 3 moved downwardly generates, by the bottom ram 4, an underpressure in the brew chamber 2, the valve 32 is opened contrary to the spring-load of ball 32, and by the underpressure in the brew chamber 2 residual coffee is sucked back, from the coffee outflow duct 18 via the suction duct 28 into the brew chamber 2. This residual coffee can be lifted, together with the leached-out coffee grounds cake K, by the bottom ram 4 out of the brew chamber 2 and can then be discarded when the brew chamber, with brew chamber cylinder 3 lowered, is opened by moving the top ram 5 horizontally into the position shown in FIG. 2.

In addition to the valve 32a, that part of the espresso brew unit 1a which generates the required underpressure for sucking back the residual coffee from the coffee outflow duct 18, can be considered as a part of the return-flow suction unit 21a according to FIG. 4.

The third embodiment of espresso brew unit 1b according to FIG. 5 including the return-flow suction unit 21b differs from espresso brew unit 1a including the return-flow suction unit 21a only by a different valve 34 in addition to the crema valve 15. The additional valve 34 includes a ball 35 that is not spring-loaded. Normally, ball 35 lies simply by action of gravity on a lower fluid-conductive valve seat 36 which is in permanent connection with the brew chamber 2.

An exemplary form of fluid-conductive valve seat 36 is shown in a plan view according to FIG. 6. It consists here essentially of three non-designated support arms extending into an opening and on which the ball 35 is disposed as long as it is not pushed by the brew chamber internal pressure against an upper, non-designated, valve seat and sealing that valve seat against suction duct 28 and coffee outflow duct 18. Sealing is already obtained at a low internal pressure in the brew chamber before the crema valve is opened by the pressure rising in the brew chamber by the inflow of the brewing water. If, however, after finishing the brewing process, the internal pressure in brew chamber 2 decreases and the brew chamber cylinder 3 is moved back downward into the position shown in FIG. 5 generating an underpressure in brew chamber 2, the ball 35 falls back from the upper valve seat to the lower valve seat 34 and the residual coffee will be sucked back from the coffee outflow duct 18 via a short suction duct 28 into the brew chamber 2.

The invention claimed is:

1. An espresso coffee maker having an espresso brew unit (1, 1a, 1b) and a coffee outflow duct (18) in fluid-conductive connection with the espresso brew unit via a crema valve (15) and having a coffee outflow (19) characterized in that a return-flow suction unit (21, 21a, 21b) is in fluid-conductive connection with said coffee outflow duct (18) between said crema valve (15) and said coffee outflow (19), and said return-flow suction unit (21, 21a, 21b) is automatically activated to suck residual coffee out of the coffee outflow duct (18) when a brewing process is finished.

2. The espresso coffee maker according to claim 1, wherein said movable brew chamber element constitutes a brew chamber cylinder (3) disposed substantially underneath a top ram (5) so that, together with it, it can form a brew chamber (2), in order to completely close said brew chamber (2), said brew chamber cylinder (3) can be moved substantially in vertical direction onto said top ram and, by substantially vertical lowering can be disconnected from said top ram (5), in order to completely open said brew chamber (2) in case of disconnected brew chamber cylinder (3), and vice versa, for closing said brew chamber, said top ram (5) can be moved substantially in horizontal direction, and coupling elements (25, 26, 27) are disposed between said brew chamber cylinder (3) and a piston rod (24) on said suction piston (23) of said return-flow suction unit (21) so that, by horizontally moving said top ram (5) into a completely open position of the brew chamber, they can be decoupled and by reverse horizontal movement of top ram (5) into a closure position of said brew chamber (2) can be coupled and are suited, in a coupled state, to transfer the vertical movement of said brew chamber cylinder (3) onto said suction piston (23).

3. The espresso coffee maker according to claim 2, wherein at least one (26, 27) of said coupling elements is coupled to said brew chamber cylinder (3) and at least another one (25) of said coupling elements is in connection with said piston rod (24) of said suction piston (23).

4. The espresso coffee maker according to any one of claims 1, 2 and 3, wherein
said suction cylinder (22) receiving said suction piston (23) forms one unit with said top ram (5) and said coupling elements (25, 26, 27) comprise, between said brew chamber cylinder (3) and said piston rod (24), on one hand, a slit (26) open on the front in a drive rod (27) at said brew chamber cylinder (3) and, on the other hand, a pin (25) on a piston rod (24) of said suction piston (23), which may be inserted into said slit (26) by horizontally moving said top ram (5).

5. The espresso coffee maker according to any one of claims 1, 2 and through 3, wherein
a suction duct (28) is branched off from coffee outflow duct (18) between said crema valve (15) and said coffee outflow (19) and opens into a suction cylinder head, and that said drain duct (29) extends on the outside downwardly from an opening in said suction cylinder (22) at a location above said piston (23) in its lower dead-center position.

6. The espresso coffee maker according to claim 4, wherein
a suction duct (28) is branched off from coffee outflow duct (18) between said crema valve (15) and said coffee outflow (19) and opens into a suction cylinder head, and said drain duct (29) extends on the outside downwardly from an opening in said suction cylinder (22) at a location above said piston (23) in its lower dead-center position.

7. An espresso coffee maker having an espresso brew unit (1, 1*a*, 1*b*) and a coffee outflow duct (18) in fluid-conductive connection with the espresso brew unit via a crema valve (15) and having a coffee outflow (19) wherein
a return-flow suction unit (21, 21*a*, 21*b*) is independently provided and is in fluid-conductive connection with said coffee outflow duct 18 between said crema valve (15) and said coffee outflow (19) and said return flow suction unit (21, 21*a*, 21*b*) is automatically activated to suck residual coffee out of said outflow duct (18) when a brewing process is finished.

\* \* \* \* \*